United States Patent [19]

Sidhu et al.

[11] Patent Number: 4,539,611
[45] Date of Patent: Sep. 3, 1985

[54] DRIVE MOTOR FOR SHALLOW DISK DRIVE ASSEMBLY

[76] Inventors: Pawitter S. Sidhu, 2900 Corda La., Bel Air, Calif. 90049; Gary M. Delgado, 1745 Carmelina Ave., Los Angeles, Calif. 90025

[21] Appl. No.: 422,645

[22] Filed: Sep. 24, 1982

[51] Int. Cl.³ .............................................. G11B 5/016
[52] U.S. Cl. ...................................................... 360/99
[58] Field of Search ...................................... 360/97–99

[56] References Cited

U.S. PATENT DOCUMENTS 3,845,339 10/1974 Merkle .................................. 310/156
3,845,995 11/1974 Wehde .............................. 310/156 X
4,101,945 7/1978 Butsch ............................... 360/97 X
4,150,406 4/1979 Stollorz .................................. 360/97

Primary Examiner—A. J. Heinz
Attorney, Agent, or Firm—Evanns & Walsh

[57] ABSTRACT

A driving motor of low profile construction for use in a disk drive assembly or unit having shallow or low profile construction. The chassis has an integrally molded motor housing which is circular. A stator is received in the upper part of the integral motor housing with the rotor below the stator in the integral housing and held in position by the magnetism in the rotor. The end of the rotor shaft is coupled to the drive spindle by way of coupling in the form of a belt.

3 Claims, 3 Drawing Figures

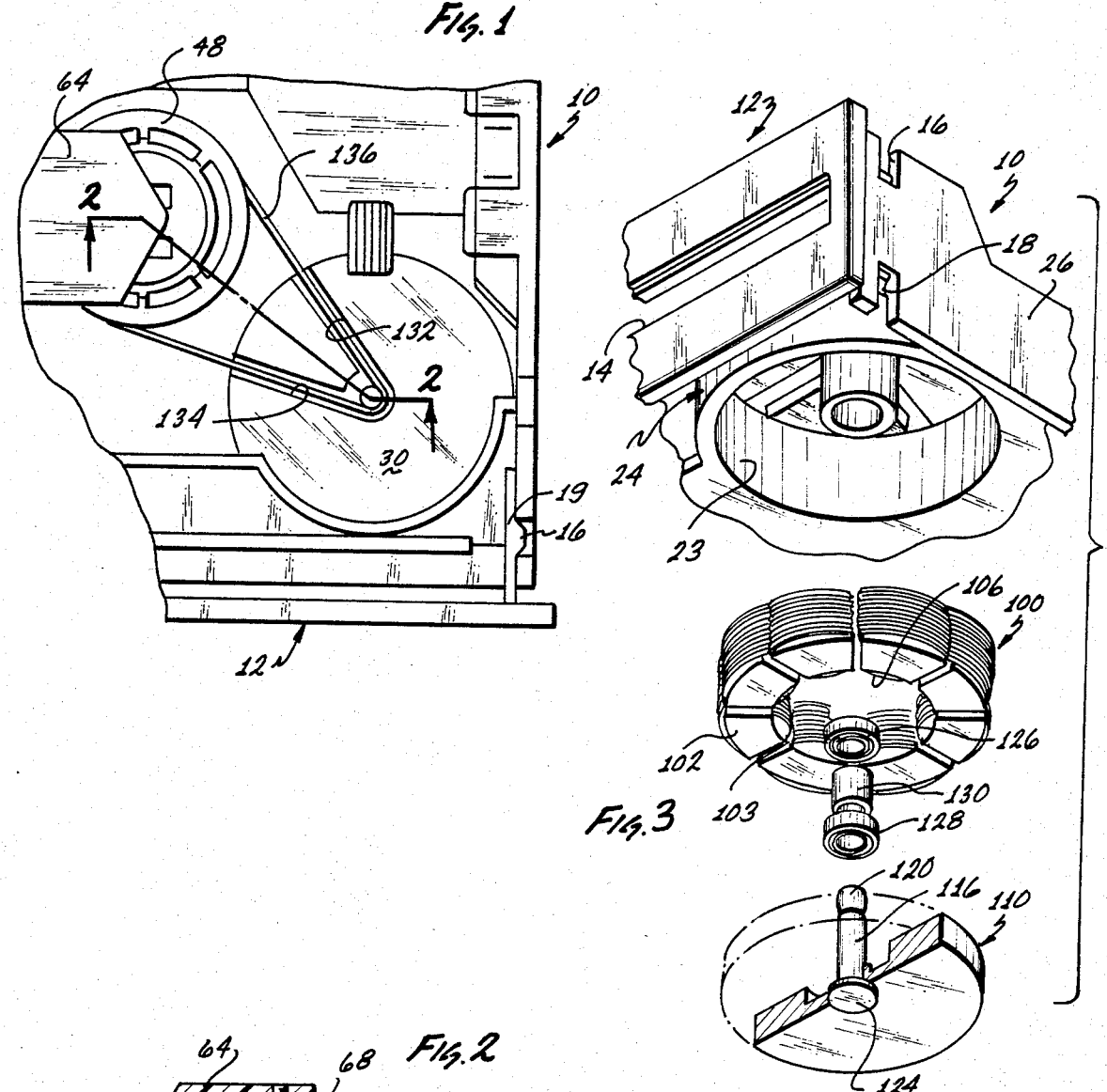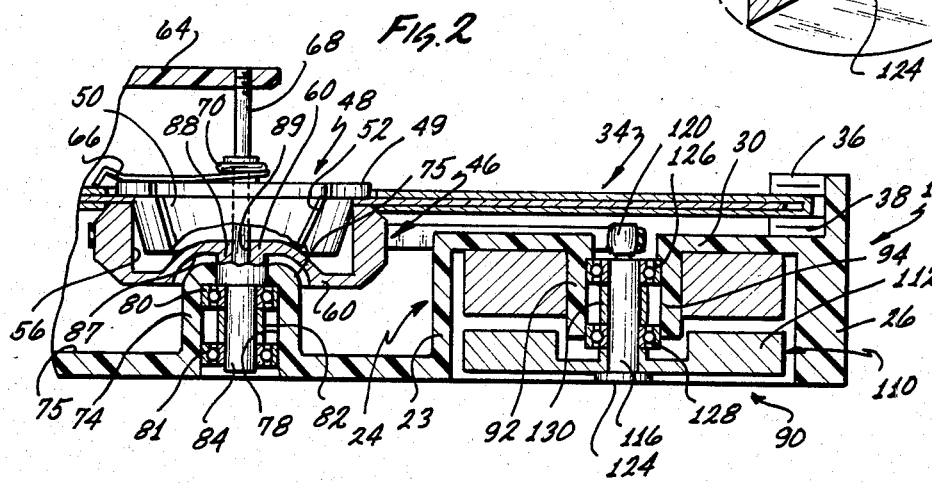

DRIVE MOTOR FOR SHALLOW DISK DRIVE ASSEMBLY

BACKGROUND OF THE INVENTION

1. Field of the Invention

The field of the invention is primarily that of floppy disk drive assemblies. The invention relates to this type of equipment wherein the drive unit, that is, the chassis or frame of the unit is constructed to be relatively shallow, that is, to have a low profile. The invention is particularly concerned with a shallow type of drive motor especially adapted for utilization in this type of drive unit but not limited thereto.

2. Description of the Prior Art

In disk drive units or assemblies typically, of course, there is a driving member or drive spindle which is driven by a motor and with which a clutch cone cooperates for holding and driving the diskette while it is in the unit. Certain units of this type are particularly adapted for use in mini and micro computers. Contemporarily designed units may be substituted for units already present in previously marketed mini and/or micro computers.

Recent developments have resulted in satisfactory designs of shallow, that is, low profile chassis units whereby two of them can be placed in a space formerly occupied by a single one, thereby doubling the capacity of the computer.

One of the difficulties or draw backs to previous designs of drive units has been one of space required by the fact that typically the drive motor for the spindle was mounted coaxially with it, that is, below it thereby increasing the depth of the unit as a whole by that amount. The art did not provide a motor of construction having a low profile, that is, being shallow in depth and still having the necessary power, that is, torque to be able to drive the unit.

The herein invention is concerned primarily with the motor, a specific example of which is described in detail hereinafter. It is intended that the invention shall fill the existing needs not presently available in the prior art and to accomplish a number of other advantages.

SUMMARY OF THE INVENTION

As previously pointed out the invention is concerned primarily with a motor adapted for drive of the spindle and consequently the disk or diskette of a disk drive assembly. The motor is especially constructed to be shallow, that is, to have a low profile enabling it to be mounted in a chassis or frame having a low profile and spaced laterally from the shaft of the spindle which it drives.

In the preferred form of the invention the motor is mounted in a drive unit chassis or frame which is shallow, that is, of low profile and which is of molded construction with a motor housing integrally molded into the housing.

The stator of the motor includes a cylindrical stator having pole pieces and windings which is mounted in the integrally formed motor housing around a central bushing. The armature of the motor may be in the form of a single disk member which includes a permanent magnet mounted on a central shaft which is journalled in a bushing in a position below the stator and is held in that position by magnetism.

In the light of the foregoing the primary object of the invention is to provide or make available an improved drive motor having a relatively small vertical dimension which is particularly adapted for drive of the spindle in a disk drive assembly unit.

A further object is to make available a motor as in the foregoing fitted into a motor housing integrally molded in the frame or chassis of the drive unit, the motor having a stator within the housing and having a rotor member including a permanent magnet mounted in the housing below the stator member.

Another object is to provide a motor as in the foregoing wherein the integrally formed housing includes a central bushing the rotor member having a shaft journalled in the bushing by way of spaced bearings carried within the bushing.

BRIEF DESCRIPTION OF THE DRAWINGS

FIG. 1 is a partial view of a part of the frame or chassis of a disk drive assembly showing the drive of the spindle from the motor by way of a belt;

FIG. 2 is a sectional view taken along the line 2—2 of FIG. 1;

FIG. 3 is an exploded isometric view showing a part of the chassis or frame, the integral motor housing, the stator, the bearings and the rotor.

DESCRIPTION OF A PREFERRED EMBODIMENT AND BEST MODE OF PRACTICE

Referring to the figures of the drawings numeral 10 designates a part of a frame or chassis which may preferably be of integral molded construction molded from a conductive plastic as described more in detail in application Ser. No. 427,597, filed Sept. 29, 1982, having common ownership. At the front of the chassis 10 is a bezel 12 having a slot 14 to receive the diskette. The bezel may be made of a material such as plastic and preferably it has a snap on construction by way of slots 16 and 18 in a side wall of the chassis 10 and similar slots on the other side as shown in detail in the application previously referred to. The bezel 12 has resilient members, one which is shown at 19 with projections that engage the slots.

The chassis 10 as stated is molded integrally and it includes an integral molded motor housing which is identified by the numeral 24 which forms a skirt 23 which extends downwardly from a surface of the chassis adjacent to a wall 26 as shown in FIG. 3. The top of the motor housing is identified at 30 in FIG. 1.

The diskette is identified by the numeral 34 in FIG. 2. As stated the diskette is inserted through the slot 14 in the bezel 12 and its edges fit between the guides at the sides of the chassis, two of such guides being shown at 36 and 38 in FIG. 2.

The drive spindle for the diskette is identified at 46. It is driven by a drive cone as identified at 48, which includes a top disk 49 and lower conical part 50 which has angularly spaced slits in it as identified at 52. The conical part 50 is received in the cylindrical bore 56 in the drive spindle 46 as may be seen in FIG. 2.

In the lower part of the drive spindle 56 is a boss 60, which will be referred to presently.

The drive cone 48 is carried on the end of an arm 64 to which is attached an actuating spring 66 the end of which is bifurcated and which straddles a stem 68 at the end of the arm 64. The drive cone 48 is carried on a stem 68 there being a holder 70 on the stem just above the bifurcated end of the actuation spring 66, which is attached to the arm 64.

Numeral 74 designates a bushing upstanding from the bottom 75 of the frame or chassis 10 and integral therewith, the bushing 74 having a bore 78.

The drive spindle 46 is mounted on a shaft or stem 84 which extends through bore 78 in the bushing 74. It is journalled in the bearings 80 and 81 in the bore 78 and held by way of a spacer sleeve 82.

As will be understood, in operation the drive cone 48 is moved into and out of engagement with bore 56 in the drive spindle 46 for driving the diskette, the center hole of which is clamped between the disk 49 on the drive disk 48 and the driving spindle 46.

The boss 60 in the drive spindle 46 is raised as shown and its underside is recessed as shown at 87. The upper part of the shaft 84 is integral with the bushing 88 on the underside of the bottom of the spindle 46 which has a bore 89 through which the shaft 68 passes. The upper part of the bushing 74 is domed as shown at 75 so as to extend into the recess 87. The construction makes it possible to decrease the overall dimension to accommodate to the low profile construction and also in order to make the bushing 74 long enough to accommodate the spaced bearings 80 and 81.

The driving motor itself is identified by the numeral 90 in the figure. It is mounted in the integral housing 24 previously described, the interior of which is identified by the numeral 23. The top 30 of the housing 24 has a central depending bushing 92 which has a bore 94.

Mounted in the top of the integral housing 24 is the stator of the motor which is identified by the numeral 100 it is, of course, circular having angularly spaced magnetic poles one of which is identified by the numeral 102 with conventional windings associated with each pole and carried in the radial slots between poles, one of which is identified the numeral 103. The stator 100 has a central opening or bore 106 and it is mounted on the bushing 92, which extends downwardly from the top 30 within the integral housing 24. The stator 100 itself is of relatively shallow construction.

The rotor of the motor is identified by the numeral 110. It can be made in two parts or it can be made as a single piece as shown in FIG. 2 which is in the form of a ring shaped permanent magnet identified by the numeral 112. The rotor is mounted on a shaft 116 the upper end of which is turned or machined as identified at 120, so as to be able to receive a belt as a coupling. At the end of the shaft 116 and below the rotor 10 is a disk 124.

The shaft 116 is journalled in the bore 94 of the bushing 92 in the two bearings identified at 126 and 128 with a spacer sleeve 130, between them.

From the foregoing, it can be seen that the motor itself is of shallow construction, that is, low profile to accommodate its assembly in the integral housing 24 in the low profile chassis 10. The rotor 110 with its shaft 116 is held in position relative to the stator 100 by the magnetism in the permanent magnetic 112.

The top 30 of the integral housing 24 has slots 132 and 134 in it. Numeral 136 designates a belt forming a coupling between the end part 120 of the shaft 116 and the spindle 46. No separate pulley is required for the spindle 46 since the body of the spindle itself receives the coupling member 136. As observed the motor is mounted laterally with respect to the driving spindle 46 rather than coaxially with it to accommodate to the low profile shallow construction. The coupling, that is, the belt 136 moves in the slots 132 and 134 in the top 30 of the integral housing 24.

From the foregoing those skilled in the art will readily understand the nature of the construction of the invention and the manner in which the objects as set forth in the foregoing are realized. All of the construction is low profile. The motor is not coaxial with the drive spindle, but is spaced laterally so as to accommodate the low profile construction. The motor itself is simplified being shallow but yet having sufficient torque for the purpose of driving the diskette.

The foregoing disclosure is representative of a preferred form of the invention and is to be interpreted in an illustrative rather than a limiting sense the invention to accorded the full scope of the claims appended hereto.

We claim:

1. As an article of manufacture, in combination, a floppy disk drive unit including a chassis frame, the said chassis frame having a relatively shallow depth dimension, means forming a part of the chassis frame providing a cavity forming a motor housing, the said motor housing being circular and including an integral central bushing part adapted to receive a vertically oriented shaft and bearing means for confining said shaft to maintain its vertical orientation while permitting axial movement thereof, one circular side of said housing being open, a stator member including windings positioned at a top of the housing around said bushing, means providing an armature mounted to said shaft to rotate about the central axis of said bushing, the said armature including a rotor member having a permanent magnet located below said stator, means for restraining the axial movement of said shaft including said permanent magnet having a relationship to the said stator whereby to be held in position by magnetism.

2. An article as in claim 1, wherein the bearing means includes a pair of spaced bearing members in said bushing, a tubular spacer member positioned between the bearing members, the said shaft being telescoped in the spacer member.

3. An article as in claim 1, the permanent magnet having a central opening, the said bushing extending into said opening.

* * * * *